United States Patent Office 3,704,134
Patented Nov. 28, 1972

3,704,134
PROCESS FOR PREPARING AN INSTANT
OAT CEREAL
Kenneth S. Ronai, Ridgewood, and Henry C. Spanier, Dumont, N.J., assignors to Nabisco, Inc., New York, N.Y.
No Drawing. Filed July 23, 1970, Ser. No. 57,763
Int. Cl. A23l 1/10
U.S. Cl. 99—83                  5 Claims

ABSTRACT OF THE DISCLOSURE

An instant oat cereal product, requiring little or no cooking is prepared by adding to processed oats, a pregelatinized starch component as a texturizing agent and a process for its preparation.

BACKGROUND OF THE INVENTION

This invention relates to an instant oat cereal product. More specifically, this invention relates to an instant oat cereal product with desirable flavor and aroma which forms a ready-to-eat oatmeal upon the addition of hot or boiling water without any cooking required.

Oatmeal is one of the most popular hot cereals, however, in many homes and public dining places it is not served due to the considerable time required for its preparation and the subsequent cleaning of the preparation utensils. Furthermore, once prepared the oatmeal has poor keeping qualities and tends to become pasty and undesirable in a short period of time. Quick cooking oat cereals have been developed but these still require a cooking time of, e.g., from 1-6 minutes, to obtain an acceptable oatmeal.

The cereal art has long sought an oat cereal product which could be employed to prepare an acceptable oatmeal without any cooking. Many attempts have been made to obtain such an instant oatmeal product and some such products are presently available to the consumer. The biggest problem has been in obtaining a product with satisfactory flavor, aroma and texture characteristics. Murray et al. U.S. Pat. 2,864,702, issued Dec. 16, 1958, discloses a process for making a toasted oat flake product said to be capable of producing oatmeal upon the addition of boiling water. Rutgers et al. U.S. Pat. 2,928,743, issued Mar. 15, 1960, discloses another process for preparing a flaked cereal product said to be capable of thickening upon the addition of liquid thereto and immediately suitable for consumption without cooking. Huffman et al., U.S. Pat. 2,999,018 issued Sept. 5, 1961, discloses an instant-type food product which upon the addition of boiling water and without further heating is said to form a product with the flavor and texture characteristics of cooked oatmeal. This product consists essentially of quick-cooking rolled oats and from 0.1 to 1.0% by weight of the rolled oats of a polysaccharide gum. Generally, the products of the above patents and other similar products have been found very different in flavor, mouth feel, appearance, stability and consistency from the conventional hot oat cereals which require at least some cooking. In the co-pending application of Ronai and Spanier, U.S. Ser. No. 823,156, filed May 8, 1969, and now U.S. Pat. 3,640,729, issued Feb. 8, 1972, there is disclosed an instant oat cereal product comprising processed oats and an edible cereal hydrolysate texturizing agent with a Dextrose Equivalent of from about 6 to about 12. By way of contrast the present instant oat cereal product contains an edible pregelatinized starch component, such as pregelatinized waxy maize starch, whereas the co-pending application of Ronai and Spanier requires the conversion of a cereal starch to a polysaccharide by means of a hydrolysis reaction.

It is, therefore, a primary object of the present invention to provide an instant oat cereal product which overcomes all the foregoing disadvantages.

It is a further object to provide an instant oat cereal product which forms a desirable ready-to-eat oatmeal composition without any cooking required.

It is a still further object of the present invention to provide an instant oat cereal product which consists essentially of processed oats and an edible pregelatinized starch texturizing agent.

Other objects and advantages of the present invention will be apparent to one skilled in the art from the following description.

SUMMARY OF THE INVENTION

The objects of the present invention are achieved by an instant oat cereal product comprising, in essential proportions, a mixture consisting of (A) processed oats and (B) an edible pregelatinized starch component as texturizing agent. The process of the present invention comprises the treating of whole oat groats to form the desired oat flakes and blending these processed oat flakes with a pregelatinized starch to form the desired product. Upon the addition of hot or boiling water to the compositions of this invention an oatmeal results with the flavor, mouth feel, appearance, stability and consistency previously found only in fully cooked cereals.

The processed oats useful in the present invention are prepared from whole oat groats. Oat groats are the kernel product resulting from the cleaning and drying of oats which removes the hulls. The whole oat groats are toasted, pearled and cut into a number of pieces. The pieces are hydrated, steamed and flaked and the flakes are subsequently dried to the desired moisture content.

The whole oat groats after cleaning are subjected to a toasting treatment until the whole oat groats have reached a temperature of from about 225° F. to about 315° F., preferably from about 275° F. to about 285° F. and a moisture content of from about 2% to about 8%, preferably from about 4.5% to about 6%. This toasting treatment is used to develop flavor and can occur in any commercially available hot air oven or dryer or other suitable available apparatus. The toasting step occurs in a period of from about 4 minutes to about 120 minutes, preferably from about 15 to about 25 minutes. During the toasting treatment the whole oat groats are continually agitated in order to prevent overtreating of any particular portion of the oat groats. After the toasting treatment is completed, the oat groats must be cooled rapidly to below 150° F. in order to stop the toasting operation and prevent over-toasting.

The cooled, toasted oat groats are then pearled to remove the outer layer (sometimes called the pericarp) of the oat groats. The pearling of the oat groats can be performed by any well-known and commercially available abrasive roll. The abrading of the oat groat causes the outer layer to separate from the remainder of the oat groat resulting in a weight loss of from about 4% to about 12% by weight of the total oat groat.

The toasted, pearled oat groats are then cut and sifted through a 7-mesh screen of 0.110 inch opening and over a 14-mesh screen of 0.0555 inch opening. The groats retained by the 7-mesh screen are re-cut and then sifted through and the throughs of the 14-mesh screen are not further used in this process. A sufficient amount of water is then added to the cut and sifted oats to raise the moisture content to from about 9% to about 12%.

The hydrated oats are then put through a tempering treatment, i.e., they are permitted to stand at a temperature of from about 65° F. to about 85° F. preferably about 75° F. for a period of from about 30 minutes to about 90 minutes, preferably about 60 minutes. This tempering step takes place in hermetically-tight bins or other suitable apparatus and permits the moisture content to be distributed uniformly throughout the oats. It also improves the resiliency of the oats and makes them more suitable for flaking.

After the tempering treatment the oats are steamed prior to being flaked. The steaming process is desirable as a means of reducing the amount of fines and breakages in the flaked product. The oats are heated utilizing steam at a temperature of from about 190° F. to bout 210° F., preferably about 205° F. for a period of time of from about 2 minutes to about 5 minutes, preferably about 3 minutes. The oats then have a moisture content of from about 13% to about 16%, preferably about 15%.

The hot, steamed oats are then fed to the conventional flaking rolls and equipment where they are flaked to a bulk density of from about 26 to about 28 grams per 100 cc., preferably about 26.5 grams per 100 cc. and a thickness of from about 0.009 inch to about 0.015 inch. To achieve the desired bulk density and thickness the surface temperature of the flaking rolls should be maintained in the range of about 180° F. to about 200° F. Thereafter, if necessary, the oat flakes are dried to reduce the moisture content to about 7% to 13%, preferably 9% to 12%.

The edible pregelatinized starch components useful in the present invention is prepared in accordance with U.S. Pat. 3,464,857, which is incorporated herein by reference, by blending a sugar and a modified or unmodified starch, mixing the resulting blend with water, simultaneously drying the blend and pregelatinizing the starch in the presence of the sugar and coarse grinding the dried mixture.

Pregelatinized starch components are illustrated in the following table:

TABLE

| Formulation number | Parts | | | |
|---|---|---|---|---|
| | 1 | 2 | 3 | 4 |
| Ingredients: | | | | |
| A waxy maize starch which had been inhibited and acetylated by treatment with a 9:1 adipic acidacetic anhydride mixed reagent; the resulting product containing 1.8%, by weight, of acetyl groups | 60 | 90 | 70 | 75 |
| Glycerol | | | 25 | |
| Sucrose | | 40 | | |
| Corn syrup | | | 10 | |
| Dextrose | | | | 25 |
| Water | 100 | 100 | 100 | 100 |

The modified starch and sugar components are intimately mixed, blended with the water and the mixture is then subjected to drum drying whereby it is placed in drums which are heated to a temperature of 170° C., and rotating at a speed of 7 revolutions per minute. The mass is thus heated and simultaneously gelatinized. The resulting product is then pulverized to obtain particles which pass through a #12 U.S. Standard Sieve but are retained on a #100 U.S. Standard Sieve. Other pregelatinized starch components are described in Examples I and II and Formulation Nos. 1, 2, 4 and 5 of Example III of U.S. Pat. 3,464,857.

A suitable edible pregelatinized starch component is commercially available from National Starch and Chemical Corporation, New York, N.Y., under the name Purity Gum 539. This product is a modified waxy maize starch which has been drum-dried in the presence of corn syrup according to the above mentioned patent.

The processed oats of the present invention are present from about 85% to about 98%, preferably from about 88% to about 95%, by weight of the total composition. If more than about 98% by weight of the total composition is utilized, then an undesirable gruel results upon the addition of water. If less than about 85% by weight of the total composition is utilized, reconstitution becomes a problem upon the addition of water.

The pregelatinized starch component of the present invention is present from about 3% to about 7%, preferably about 3.5% to about 4% by weight of the total composition. If more than about 7% by weight of the total composition is added, there will be no advantages achieved. If less than about 3% by weight of the total composition is added, the desired advantages of this invention will not be achieved, i.e., the addition of a hot liquid will result in a pasty gruel rather than the desired oatmeal.

Miscellaneous materals such as sugar, salt, other flavoring agents, minerals, vitamins, freeze dried fruits, oils, butylated hydroxytoluene and other materials which are well-known as constituents in cereal formulations and which are compatible in the formulations of the present invention can also be present in minor amounts.

The various constituents of the instant oat cereal compositions of the present invention can be admixed in any manner and sequence to achieve the desired objects as stated above. It is preferred, however, for ease of formulation to and any optional components, e.g., salt and vitamins, to the pregelatinized starch component and then add this mixture to the processed oats.

The following examples will illustrate in detail the manner in which the invention can be practiced. It will be understood, however, that the invention is not confined to the specific limitations set forth in the individual examples but rather to the scope of the appended claims.

PREFERRED EMBODIMENTS

Example I

Ten pounds of oat groats were placed in a Jabez Burns Roaster (manufactured by Jabez Burns & Sons, New York) at a temperature of about 270° F. for a period of about 20 minutes to toast the oat groats. The toasted oat groats were then cooled to a temperature of about 150° F. The oats were then pearled utilizing a Satake Rice Machine Type RM abrasive roller (manufactured by Satake Engineering Co. Ltd., Tokyo, Japan) and then cut on a Kipp Kelley Rotary Granulator, Model STD, Size 1 (manufactured by Kipp Kelley Ltd., Winnipeg, Canada) and sifted. Only the cut oat groats retained on a 14-mesh screen with a 0.0555 inch opening were retained with the fines being discarded. 280 milliliters of water were added to raise the moisture content of about 10% and the hydrated oats were tempered at room temperature (about 72° F.) for a period of about 1 hour in a sealed container. The oats were then placed in a 10 quart modified Hobart Bowl Steam Injection Agitator Kettle at 196° F. and steamed for a period of about 3 minutes. The oats were then placed in a Lauhoff Model NSP-10 flaking roll (manufactured by Lauhoff Roller Mill Works, Detroit, Mich.) whereby 8.35 pounds of oat flakes were obtained. These processed oats were dried to a moisture content of about 10% and blended at a regulated rate with 0.36 pound of Purity Gum 539 to form the desired product, as follows:

| | Percent by weight |
|---|---|
| Processed oats | 95.9 |
| Purity Gum 539 [1] | 4.1 |
| | 100.0 |

[1] As hereinbefore defined.

A portion of the resulting product was reconstituted by the addition of ⅔ of a cup of boiling water with mixing. The reconstituted product was then submitted to a test panel and the consensus of opinion was that the taste, texture and aroma characteristics were those of a desirable oat cereal product.

EXAMPLE II

An instant oat cereal product, as follows, was prepared according to the process of Example I.

| | Percent by weight |
|---|---|
| Processed oat flaked | 93.7 |
| Purity Gum 539 [1] | 4.0 |
| Salt | 2.3 |
| | 100.0 |

[1] As hereinbefore defined.

A portion of the product was reconstituted and submitted to a test panel as in Example I. The consensus of opinion was that the taste, texture and aroma characteristics were those of a desirable oat cereal product.

EXAMPLE III

An instant oat cereal product, as follows, was prepared according to the process of Example I.

| | Percent by weight |
|---|---|
| Processed oats | 89.63 |
| Purity Gum 539 [1] | 3.77 |
| Salt | 2.44 |
| Minerals (iron) | 0.15 |
| Wheat Germ-Vitamin Mix | 2.61 |
| Butylated hydroxytoluene in vegetable oil | 0.02 |
| Sugar | 1.38 |
| | 100.0 |

[1] As hereinbefore defined.

A portion of the product was reconstituted and submitted to a test panel as in Example I. The consensus of opinion was that the taste, texture and aroma characteristics were those of a desirable oat cereal product.

EXAMPLE IV

An instant oat cereal product, as follows, can be prepared according to the proces of Example I, to produce taste, texture and aroma characteristics of a desirable oat cereal product.

| | Percent by weight |
|---|---|
| Processed oats | 94.4 |
| Pregelatinized starch [1] | 3.8 |
| Salt | 1.8 |
| | 100.0 |

[1] Formulation 2 in table.

In addition to the preferred embodiments described herein, other arrangements and variations within the scope and spirit of the invention and the appended claims will occur to those skilled in the art.

What is claimed is:

1. A process for the production of an instant oat cereal product which upon the addition of hot or boiling water forms a ready-to-eat oatmeal without any cooking required which comprises the steps of:
    (A) toasting whole oat groats at a temperature of from about 225° F. to about 315° F. for a period of from about 4 minutes to about 120 minutes and subsequently cooling to below 150° F.;
    (B) pearling said toasted whole oat groats;
    (C) cutting and sifting said toasted, pearled whole oat groats through a 7-mesh screen of 0.110 inch opening and over a 14-mesh screen of 0.0555 inch opening;
    (D) hydrating said oats by the addition of water to a moisture content of from about 9% to about 12%;
    (E) tempering said oats at a temperature of from about 65° F. to about 85° F. for a period of from about 30 minutes to about 90 minutes;
    (F) steaming said oats at a temperature of from about 190° F. to about 210° F. for a period of from about 2 minutes to about 5 minutes;
    (G) flaking and drying said oats to a moisture content of from about 7% to about 13%; and
    (H) blending said processed oats with from about 3% to about 7% by weight of a starch component, said starch component being a product prepared by drying and simultaneously gelatinizing starch in the presence of a sugar.

2. The process of claim 1 wherein said toasting is at a temperature of from about 275° F. to about 285° F.

3. The process of claim 1 wherein said toasting is for a period of from about 15 minutes to about 25 minutes.

4. The process of claim 1 wherein said tempering is at a temperature of about 75° F. for a period of about 60 minutes.

5. The process of claim 1 wherein the blending is with about 3.5% to about 4% by weight of a starch component prepared by drying and simultaneously gelatinizing a modified waxy maize starch in the presence of corn syrup.

References Cited
UNITED STATES PATENTS

| | | | |
|---|---|---|---|
| 3,520,695 | 7/1970 | Hanser | 99—83 |
| 2,864,702 | 12/1958 | Murray et al. | 99—80 |
| 2,278,465 | 4/1942 | Musher | 99—83 |
| 3,464,857 | 9/1969 | Marotta et al. | 127—71 |

RAYMOND N. JONES, Primary Examiner